United States Patent Office 3,704,196
Patented Nov. 28, 1972

3,704,196
SELF-CURING SEALANT COMPOSITIONS
John E. Callan, Trenton, N.J., assignor to Cities Service Company, New York, N.Y.
No Drawing. Filed Dec. 22, 1969, Ser. No. 887,402
Int. Cl. B29c 27/30; C09k 3/10
U.S. Cl. 156—306                                    7 Claims

ABSTRACT OF THE DISCLOSURE

Tapes for sealing windows in automotive and architectural applications are formulated from butyl rubber, a plasticizer and carbon black. Minor amounts of resorcinol, a formaldehyde donor and a silica filler are also included in the formulation to provide a self-curing tape which slowly vulcanizes in service and which is characterized by excellent bond strength and low heat flow.

BACKGROUND OF THE INVENTION

This invention relates to the compounding of butyl rubber and more particularly relates to the formation of self-curing sealant compositions which contain butyl rubber as the base. Sealants are generally of two classes, i.e. hand or gun applied caulks and preformed tapes or strips.

For the sealing of windows, e.g. automobile windshields, a tape having a desired size and shape is formed by the extrusion of a pliant sealant composition, and this is then applied to the joint between the windshield and the frame of the automobile. The tape must be stiff enough to remain in place after the seal is made, but not so stiff as to complicate the application thereof or to prevent the formation of a good adhesive bond with the glass and metal substrates. Butyl rubber is particularly desirable as a base in a sealant composition because of its excellent resistance to weathering, but in the past it has been very difficult to form a tape from this rubber which is characterized by ease of application, good bonding strength and self-supporting properties. Cold flow, particularly, has been a problem, i.e. if the tape stock is compounded soft enough to provide both ease of application and good bondability to the substrates, the tape may sag out of shape and/or flow out of place after the tape is installed.

Reduction in the cold flow of butyl sealant tapes has heretofore been accomplished by use of a vulcanizing agent which is inactive in the presence of a solvent that is included in the sealant composition, and whereupon evaporation of the solvent the rubber slowly cures at temperatures in excess of about 100° F. The tape is thus applied "green" for curing in service on the vehicle, being pliant enough for easy application to the structural joint and becoming stiffer as the rubber cures. The trouble with this method is, however, that use of a solvent requires additional expense, special processing techniques and more stringent safety precautions. Furthermore, evaporation of the solvent can be too slow and the sealant may sag or flow out of place before the rubber can cure.

SUMMARY OF THE INVENTION

The present invention is based upon the discovery that butyl rubber tape compositions, which are self-curing in service, can be produced by the inclusion of carbon black, a silica filler, resorcinol and a formaldehyde donor, i.e. a compound which liberates formaldehyde upon moderate extension and to reduce the viscosity of the composition. Accordingly, the resultant tapes are sufficiently compliant for easy application and yet are resistant to sag and cold flow. After application of the tape, curing occurs slowly as the seal is exposed to temperatures which result from normal exposure to atmospheric conditions, e.g. 125°–190° F. To further advantage, the tapes of this invention are characterized by excellent adhesion to the substrates of the structural members to which it is applied, frequently metal and glass.

In carrying out the invention, the following ingredients are homogeneously blended together:

(a) 100 parts of butyl rubber,
(b) from about 40 to about 150 parts by weight of carbon black,
(c) from about 50 to about 150 parts by weight of a rubber plasticizer,
(d) from about 15 to about 30 parts by weight of a silica filler,
(e) from about 1 to about 10 parts by weight of resorcinol, and,
(f) from about 1 to about 10 parts of a formaldehyde donor.

The blending can be carried out in a Baker-Perkins mixer, for instance, and the temperature of mixing must not exceed about 200° F. after the formaldehyde donor has been added lest the physical properties of the resultant composition be detrimentally affected by excessive, premature reaction with formaldehyde. Where preferable, the temperature of the mixture may be maintained substantially below 200° F. by use of cooling on the mixer. To enhance blending, some or even all of the ingredients of the composition other than the formaldehyde donor can, on the other hand, be preliminarily mixed at a temperature which is higher than 200° F., and addition and blending of the formaldehyde donor can then take place after the preliminary mixed ingredients have been cooled down. By means of this technique, thorough dispersion of the carbon black, silica and any other mineral fillers within the rubber is assured without risk of premature reaction with the formaldehyde. On other instances the rubber, carbon black, fillers and even the plasticizer can be preliminarily mixed in the liquid phase by means of a latex or rubber in solution and then agglutinated to produce a masterbatch of these ingredients. The resorcinol, the formaldehyde donor and all or part of the silica filler can then be blended with the masterbatch.

The term "formaldehyde donor" as used herein will be understood to mean an organic compound which liberates formaldehyde upon mild heating, e.g. 120°–200° F. Examples of such compounds are hexamethylenetetramine, Cohedure A, and paraformaldehyde. Cohedure A is the proprietary trade name of Farbenfabriken Bayer AG for a compound the precise composition of which is unknown, but which is described as a colorless, viscous liquid which liberates formaldehyde on heating and is further characterized by a pH of about 6.5, a specific gravity of about 1.2, and the ability to dissolve freely in water and many organic solvents.

Rubber plasticizers which can be employed to advantage in formulating the sealant compositions of this invention include non-aromatic extender oils, low molecular weight polybutenes, and mixtures of these.

Silica fillers which can be employed with the invention include various types of hydrated precipitated silicas and hydrated precipitated calcium silicates.

heating. A plasticizer is also included for the purpose of

When hexamethylenetetramine is employed as the formaldehyde donor, from about 1.6 to about 3.2 parts by weight thereof can be employed to advantage in conjunction with from about 2.5 to about 5 parts by weight of resorcinol. When Cohedure A® is employed as the formaldehyde donor, from about 1.5 to about 7.5 parts by weight thereof can be advantageously employed in conjunction with from about 1.5 to about 7.5 parts by weight of resorcinol. In either case, hydrated precipitated silica can be employed to advantage as the silica filler.

As previously indicated, the compositions of the present invention will slowly vulcanize at temperatures of 125°–200° F. even though no conventional vulcanizing agents are employed. Neither resorcinol, the aforementioned formaldehyde donors, nor mixtures thereof, is regarded to be a vulcanizing agent for butyl rubber, and the slow curing effect which is imparted to the present compositions by the combination of resorcinol, formaldehyde donor, silica and carbon black is therefore considered to be a novel discovery although the specific curing reaction is not known. Tests have nonetheless indicated that the present compositions are stable for up to three months at room temperature and for up to 3 weeks at 125° F. Tests have also indicated that the compositions are substantially cured after about one week at 190° F. and that the vulcanization advances slightly thereafter at 190° F. to a state of near completion after about one month.

Sealant tapes must be characterized by resistance to flow and good bonding strength both during and after the curing period. The compositions of the present invention excel in these particular performance catagories.

DESCRIPTION OF PREFERRED EMBODIMENTS

Example I

Sealant tape compositions were compounded in accordance with the following formulations:

|  | Parts by weight | | | | |
|---|---|---|---|---|---|
|  | A | B | C | D | E |
| Butyl rubber (Mooney viscosity ML-3 @ 260° F.=55) | 100 | 100 | 100 | 100 | 100 |
| FEF carbon black | 70 | 70 | 70 | 70 | 70 |
| Indopol H-100® [1] | 60 | 60 | 60 | 60 | 60 |
| Sunpar 2100® [2] | 60 | 60 | 60 | 60 | 60 |
| HiSil 233® [3] | 15 | 15 | 15 | 15 | 15 |
| Cohedur RL® [4] |  | 3 | 5 |  |  |
| Resorcinol |  |  |  | 2.5 | 5.0 |
| Hexamethylenetetramine |  |  |  | 1.6 | 3.2 |

[1] Polybutene, Amoco Chemicals Corp.
[2] Paraffinic extender oil, Sun Oil Co.
[3] Precipitated hydrated silica, PPG Industries Inc.
[4] Bonding agent consisting of 10 p.b.w. Cohedure A®, 10 p.b.w. resorcinol and 2 p.b.w. of the plasticizer Unimoll DB®, the latter being dibutyl phthalate; Farbenfabriken Bayer AG.

All of the compositions were blended in a Baker-Perkins mixer. In mixing Compositions A, B, and C, the butyl rubber, the silica, ⅔ of the carbon black and ½ of the plasticizers were added initially to the mixer at room temperature and with the ram on. After 3 minutes another ¼ of the carbon black was added and the other ¼ was added after 6 minutes. After 9 minutes the temperature of the mixture was about 190° F. and cold water was turned on for cooling the mixer. The remainder of the plasticizer was then added in three or four increments after 12 minutes. With compositions B and C, the Cohedure RL® was then added and the mixing was continued for four minutes, with the ram off, prior to dumping. The temperature of mixing during incorporation of the Cohedure RL® was within the range of about 150° F. to about 160° F.

In mixing Compositions D & E, the butyl rubber, the silica, ⅔ of the carbon lack and ½ of the plasticizers were added initially to the mixer at 260° F. and with the ram on. After 3 minutes another ¼ of the carbon was added and the other ¼ was was added after 6 minutes. The resorcinol was added to the mixer after 7 minutes, and at that time the temperature of the blend was about 260° F. At 10 minutes cold water was turned onto the mill for cooling and the remainder of the plasticizer was added in three or four increments. With the ram off, the mixture was allowed to cool down to about 150° F. and the hexamethylenetetramine was added. Mixing was then continued for four minutes during which time the temperature rose to a peak of 180° F. The mixture was then dumped.

The physical properties of these compositions were then tested and the results of the tests are shown in Table I. The test procedures are described as follows:

Compression (p.c.i.)—Two specimens of tape 3″ long x ⅜″ square are placed one inch apart between two glass plates having dimensions of 3″ x 3″ x ¼″. This assembly is compressed in an Instron Tester at a speed of 2 inches per minute until the distance between the plates is 0.200 inch. The pounds of pressure required to achieve this degree of compression is then converted to pounds per cubic inch based on the volume of the tape specimens. Testing is done at 75° F. This test provides one indication of ease of application. Compression values of 65 to 115 p.c.i. are desirable.

5′ Rebound, in.—Using the same assembly as was employed for the compression test, distance between the glass plates is measured 5 minutes after the pressure is released. Testing is conducted at 75° F. This distance should not exceed 0.250″, for otherwise the recovery of the tape from deformation may be so great as to cause mechanical problems after installation.

Yield (p.s.i.)—Using the same assembly as for compression and rebound, the glass plates are pulled apart in the Instron machine at the rate of 1 inch per minute (75° F.) to failure of either the cohesive or adhesive bond. Pounds of pull required to effect this separation is converted to pounds per square inch based on the original average cross-sectional area of the tape specimens. A test value of at least 7.5 p.s.i. is desirable. This test measures the cohesive strength of the tape.

Heat flow test—An assembly as is used in the compression test is made up and is compressed to a thickness of 0.200″ and held there for one minute (spacers are used to prevent overcompression). Compression is released, the spacers are removed, and the assembly is then subjected to the compression of a 1½ lb. weight. After 1 hour at 75° F., the distance between the plates is measured. After 24 hours at 190° F., the assembly is allowed to cool to room temperatutre for one hour and the distance between the plates is then measured. With either test, the distance between the plates should not be less than 0.200″, the original compression thickness. This test measures the resistance to flow of the tape.

Horizontal heat sag (1/32″ at 190° F.)—A 3″ long specimen of ⅜″ square tape is adhered to a metal panel and the panel is then suspended vertically in a 190° F. oven with the 3″ dimension of the tape in the horizontal plane. Heat sag is measured at the top outermost edge of the specimen. Sag should not exceed 1/32″.

Fatigue testing at 75° F. (unprimed).—A 6″ long by ⅜″ square tape specimen is adhered to and sandwiched between glass and metal plates. The plates are then moved back and forth with relation to one another through a distance of plus and minus 0.03 inch at a rate of 660 cycles per minute. At the end of 100,000 cycles, the assembly is checked for failure of cohesive bond between the tape and the substrates.

TABLE I

| | Composition | | | | |
|---|---|---|---|---|---|
| | A | B | C | D | E |
| Compression (p.c.i.) | 67 | 70 | 68 | 80 | 79 |
| 5′ rebound, in | 0.228 | 0.223 | 0.223 | 0.219 | 0.223 |
| Yield, p.s.i. | 6.6 | 8.2 | 8.5 | 8.5 | 8.5 |
| Heat flow, in.: | | | | | |
| 1 hr. at 75° F | 0.199 | 0.203 | 0.204 | 0.205 | 0.206 |
| 24 hrs. at 190° F | 0.146 | 0.205 | 0.211 | 0.206 | 0.205 |
| Δ change, in | −0.053 | +0.002 | +0.007 | +0.001 | −0.001 |
| Fatigue Testing at 75° F. (unprimed) | | | | | |
| Glass to aluminum: Aged 1 week at 190° F | Failed | Passed | Passed | Passed | Passed |
| Glass to painted steel: Aged 1 week at 190° F | Failed | Passed | Passed | Passed | Passed |
| Horizontal heat sag, 190° F | 5/32″ | 1/32″ | 1/32″ | 0 | 0 |
| Peel strength (lb./in.) to glass: | | | | | |
| Original (unaged) | 4.8 | | 4.4 | | |
| Aged: | | | | | |
| 1 hr. at 190° F | 4.0 | | 4.8 | | |
| 4 hr. at 190° F | 4.0 | | 7.3 | | |
| 16 hr. at 190° F | 4.0 | | 6.0 | | |
| 3 days at 190° F | 3.8 | | 7.8 | | |
| 1 week at 190° F | 4.5 | | 8.0 | | |
| 10 min at 300° F | 5.5 | | 7.8 | | |
| 30 min. at 300° F | 4.5 | | 7.5 | | |
| 1 hr. at 300° F | 4.0 | | 8.3 | | |

In conducting the peel test, sheets of the composition 10 mils thick were adhered to sheets of Mylar® two mils thick. The resultant specimens were then rolled onto glass substrates. Peeling was accomplished by pulling the specimens away from the glass substrates at a 90 degree angle with an Instron Tester at the rate of 12 inches per minute.

It is clear from the data shown in Table I that Compositions B–E which were produced in accordance with the invention are high quality sealing tapes and that they are distinctly superior to Composition A which contained no formaldehyde donor or resorcinol.

While the invention has been described with reference to particular materials, formulations, process conditions and the like, it will be understood that still others can be employed without departing from the spirit or scope of the invention as expressed in the appended claims.

I claim:

1. The method of sealing a structural joint which comprises applying to said joint an unvulcanized elastomeric sealant composition in the form of an extruded tape which contains a homogeneous blend of the following ingredients:
    (a) 100 parts by weight of butyl rubber,
    (b) about 40 to about 150 parts by weight of carbon black,
    (c) about 50 to about 150 parts by weight of a rubber plasticizer,
    (d) about 15 to about 30 parts by weight of a silica filler,
    (e) about 1 to about 10 parts by weight of resorcinol, and
    (f) about 1 to about 10 parts by weight of a formaldehyde donor which liberates formaldehyde upon heating,
    followed by prolonged heating of said sealant tape within the temperature range of about 125°–200° F. and accompanied by liberation of formaldehyde from said donor, and slowly vulcanizing the sealant composition after application of said tape to the structural joint by reaction of the sealant compositions with formaldehyde liberated by the donor during the prolonged heating of the tape.

2. The method of claim 1 wherein the silica filler is hydrated precipitated silica.

3. The method of claim 1 wherein the formaldehyde donor is hexamethylenetetramine.

4. The method of claim 1 wherein the plasticizer is selected from the group consisting of non-aromatic extender oils, low molecular weight polybutene, and mixtures thereof.

5. The method of claim 1 wherein the content of resorcinol is from about 2.5 to about 5 parts by weight, the formaldehyde donor is hexamethylenetetramine, the content of said donor is from about 1.6 to about 3.2 parts by weight, and the silica filler is hydrated precipitated silica.

6. The method of claim 1 wherein the rubber and at least some of the other said ingredients excepting the formaldehyde donor are preliminarily mixed at a temperature in excess of about 200° F., and the formaldehyde donor is subsequently added to the premixed ingredients and blended therewith at a temperature of not in excess of about 200° F.

7. The method of claim 1 wherein the formaldehyde donor liberates formaldehyde when heated to a temperature of about 120° to about 200° F.

References Cited

UNITED STATES PATENTS

| | | | |
|---|---|---|---|
| 2,821,232 | 1/1958 | Wolf | 260—41.5 R |
| 2,996,468 | 8/1961 | Powers et al. | 260—29.3 |
| 3,242,118 | 3/1966 | St. Clair et al. | 260—29.3 |
| 3,366,707 | 1/1968 | Delalande et al. | 260—846 |
| 3,370,023 | 2/1968 | Huang et al. | 260—846 |
| 3,597,377 | 8/1971 | Berejka et al. | 260—846 |

OTHER REFERENCES

Damusis—Sealants (Reinhold) (N.Y.) (1967), pp. 69, 88, 283–284, 287–289, and 309–310.

Carswell—Phenoplasts (Interscience) (N.Y) (1947). pp. 51–54.

Skeist, "Handbook of Adhesives," Van Nostrand Reinhold Company, 1962, p. 467.

ALLAN LIEBERMAN, Primary Examiner

U.S. Cl. X.R.

156—334, 335; 260—33.6 A, 33.6 AO, 41.5 R, 41.5 A, 846